(12) United States Patent
Aldraihem

(10) Patent No.: US 8,201,365 B2
(45) Date of Patent: Jun. 19, 2012

(54) VIBRATION RESISTANT REINFORCEMENT FOR BUILDINGS

(76) Inventor: Osama J. Aldraihem, Riyadh (SA)

(*) Notice: Subject to any disclaimer, the term of this patent is extended or adjusted under 35 U.S.C. 154(b) by 8 days.

(21) Appl. No.: 12/763,300

(22) Filed: Apr. 20, 2010

(65) Prior Publication Data

US 2011/0252734 A1    Oct. 20, 2011

(51) Int. Cl.
*E04B 1/98* (2006.01)
*E04H 9/02* (2006.01)
(52) U.S. Cl. ................................ 52/167.1; 52/167.2
(58) Field of Classification Search ....... 52/167.1–167.9
See application file for complete search history.

(56) References Cited

U.S. PATENT DOCUMENTS

| | | | | |
|---|---|---|---|---|
| 6,147,439 | A * | 11/2000 | Takagi et al. | 310/365 |
| 7,160,607 | B2 * | 1/2007 | Tanimoto | 428/297.4 |
| 2005/0062365 | A1 * | 3/2005 | Tanimoto | 310/327 |
| 2007/0108867 | A1 * | 5/2007 | Saloka et al. | 310/311 |
| 2008/0261042 | A1 * | 10/2008 | Brandstrom | 428/375 |
| 2008/0307723 | A1 * | 12/2008 | Smith et al. | 52/167.8 |

* cited by examiner

*Primary Examiner* — Mark Wendell
(74) *Attorney, Agent, or Firm* — Timberline Patent Law Group PLLC

(57) ABSTRACT

A reinforcement for buildings is provided. The reinforcement is composed of a mixture of a plurality of piezoelectric rods, a plurality of carbon fibers and cement material. The mixture imparts a vibration damping characteristic in the reinforcement.

19 Claims, 4 Drawing Sheets

VIBRATION RESISTANT REINFORCEMENT FOR BUILDINGS

FIELD OF THE INVENTION

The invention generally relates to reinforcement used in constructing buildings, and more specifically, to reinforcements having capability of damping vibration in buildings.

BACKGROUND OF THE INVENTION

In civil structures which host sensitive equipments, such as measuring and manufacturing equipments, vibration is considered to be a hazardous phenomenon. Occurrence of minimal vibration in the civil structures may hamper performance of sensitive equipments. Therefore, civil structures such as, buildings corresponding to a fabrication lab or a NANO lab, require minimization of the vibration so that sensitive equipments are not affected.

There have been methods for constructing buildings with civil structure blocks which are vibration resistant. These civil structure blocks are manufactured by embedding viscoelastic polymers in cement material of the civil structure blocks. However, addition of a polymer material in the cement results in inclusion of a softening material. Therefore, overall strength and rigidity of the civil structure blocks is reduced.

In another method, plastic reinforcements are used to provide resistance from corrosion and flexibility in the reinforcements. However, such reinforcements are not vibration resistant.

There is therefore a need of a reinforcement which is capable of damping vibration in buildings. Further, there is a need of maintaining strength and rigidity of such reinforcements.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
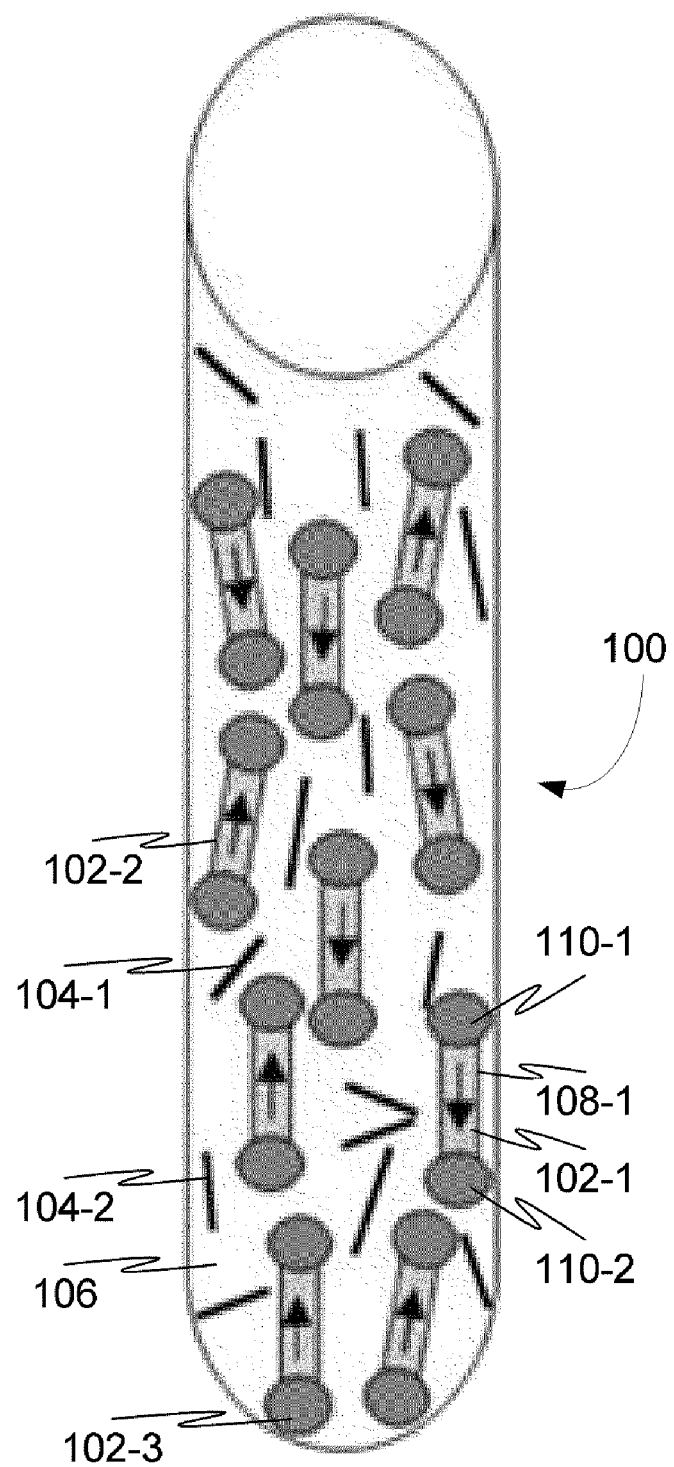
FIG. 1 illustrates a reinforcement in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the present invention, it should be observed that the embodiments reside primarily in combinations of method steps and components related to vibration resistant reinforcement for buildings. Accordingly, the components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking, pursuant to various embodiments, the invention provides a reinforcement for buildings. The reinforcement includes a mixture of a plurality of piezoelectric rods, a plurality of conductive fibers, and a plastic matrix. The mixture imparts a vibration damping characteristic to the reinforcement.

FIG. 1 illustrates a reinforcement 100 in accordance with various embodiments of the invention. Examples of reinforcement 100 include, but are not limited to a rod, a bar, a wire, a rebar, and a cable. Reinforcement 100 may be used in various civil structures such as, buildings, bridges, tunnels and so forth. Further, a cross-section of reinforcement 100 may be designed into various shapes such as, square, circle, I shape, triangle, and so forth.

Reinforcement 100 is composed of a mixture of a plurality of piezoelectric rods 102-$n$, a plurality of conductive fibers 104-$n$ and a plastic matrix 106. The mixture imparts a vibration damping characteristic to reinforcement 100.

Plurality of piezoelectric rods 102-$n$ may be composed of piezoelectric ceramic materials, such as lead zirconate titanate (PZT) or similar materials. While mixing plurality of piezoelectric rods 102-$n$ in the mixture, plurality of piezoelectric rods 102-$n$ may be oriented in different directions with respect to reinforcement 100. The orientation of piezoelectric rods 102-$n$ in the mixture is explained in more detail in conjunction with FIG. 2. Further, plurality of piezoelectric rods 102-$n$ are polarized along longitudinal axis of piezoelectric rods 102-$n$ prior to mixing plurality of piezoelectric rod 102-$n$ to the mixture.

In an embodiment, a piezoelectric rod, such as piezoelectric rod 102-1, includes a rod 108-1. Rod 108-1 is composed of a piezoelectric material. Further, piezoelectric rod 102-1 also includes an electrode 110-1 and an electrode 110-2. Electrode 110-1 and electrode 110-2 are placed at each end of rod 108-1. In an embodiment, electrode 110-$n$ may be composed of one of a metal material and a piezoelectric material. Further, electrode 110-$n$ may be shaped as an oblate ellipsoid.

In another embodiment, the piezoelectric rod, such as piezoelectric rod 102-1, is dumbbell shaped, such that ellipsoid ends of the dumbbell shape of the piezoelectric rods act like electrode 110-$n$. The dumbbell shape enables the piezoelectric rod to efficiently handle and transfer stress which may be developed due to vibration.

Plurality of piezoelectric rods 102-n included in the mixture exhibits piezoelectric property when reinforcement 100 is subjected to stress due to vibration. Based on the stress, plurality of piezoelectric rods 102-n are deformed and mechanical energy of the stress is converted into electrical charge by plurality of piezoelectric rod 102-n.

The electrical charge generated by plurality of piezoelectric rods 102-n is collected at electrodes 110-n. From electrodes 110-n, the electrical charge is passed through the mixture of plurality of conductive fibers 104-n and plastic matrix 106. In the mixture, a conductive fiber, such as conductive fiber 104-1, is used for creating an electrical path for transferring electrical charge generated by plurality of piezoelectric rods 102-n. The conductive fiber is composed of a conductive material such as, carbon. The electrical charge passed through the conductive fiber is dissipated as heat energy due to resistance provided by plastic matrix 106.

Plastic matrix 106 is a binding material for holding plurality of piezoelectric rods 102-n and plurality of conductive fibers 104-n into reinforcement 100. Plastic matrix 106 is composed of a plastic material such as, thermoplastic, polyethylene, polyvinyl chloride, polypropylene, polystyrene, and acrylonitrile butadiene styrene. Plastic matrix 106 provides resistance from corrosion and flexibility in reinforcement 100. Further, plastic matrix 106 provides resistance to the electrical charge flowing in plurality of conductive fibers 104-n, which results in dissipation of the electrical charge into heat energy by Joule Effect.

Therefore, the mixture of plurality of piezoelectric rods 102-n, plurality of conductive fibers 104-n and plastic matrix 106 enable dissipation of dynamic stress developed due to vibration in reinforcement 100, into heat energy. As a result, the mixture imparts a vibration damping characteristic in reinforcement 100. A level of the vibration damping characteristic is based on a ratio of plurality of piezoelectric rods 102-n, plurality of conductive fibers 104-n and plastic matrix 106 in the mixture. As plurality of piezoelectric rods 102-n directly convert stress developed due to vibration into electrical charge, the level of vibration damping characteristic is directly proportional to a weight percentage of plurality of piezoelectric rods 102-n in the mixture. Thus, a higher weight percentage of plurality of piezoelectric rods 102-n in the mixture imparts higher level of vibration damping characteristic in reinforcement 100.

Further, the level of vibration damping characteristic is based on a resistance load of reinforcement 100. The resistance load is resistance created by plastic matrix 106 for dissipating the electrical charge conducted by plurality of conductive fibers 104-n. The resistance load is increased by decreasing a weight percentage of plurality of conductive fibers 104-n. Therefore, the resistance load is inversely proportional to the weight percentage of plurality of conductive fibers 104-n. Further, the resistance load is directly proportional to a weight percentage of plastic matrix 106. An optimum ratio of weight percentages of plurality of conductive fibers 104-n and plastic matrix 106 is chosen to achieve a required level of resistance load, thereby imparting a required level of vibration damping characteristic in reinforcement 100. The optimum ratio of the weight percentage of plurality of conductive fibers 104-n depends on a targeted vibration frequency to be absorbed, because increasing or decreasing the weight percentage of plurality of conductive fibers 104-n may affect damping characteristics of reinforcement 100. Therefore, for the targeted vibration frequency, the weight percentage of plurality of conductive fibers 104-n is maintained as less as possible.

In addition, the level of vibration damping characteristic is also dependent on shape and size of a piezoelectric rod, such as piezoelectric rod 102-1. An aspect ratio, which is length/radius ratio of the piezoelectric rod, is directly proportional to the level of vibration damping characteristic. A higher aspect ratio results in higher conversion of stress developed due to vibration to electrical charge. Hence, the level of vibration damping characteristic of reinforcement 100 increases. Further, the level of vibration damping characteristic may also be influenced by shape of electrodes 110-n of piezoelectric rod 102-1. Based on shape of electrodes 110-n, the electrical charge is collected at edges of electrodes 110-n Electrodes of oblate ellipsoid shape can greatly improve the stress transfer efficiency between the piezoelectric rod and the surrounding matrix (plastic 106 and conductive fibers 104-n) due to anchorage effect; thus, enhancing the damping capability of reinforcement 100, thereby improving stress transfer efficiency in the mixture. Therefore the level of vibration damping characteristic of reinforcement 100 is improved.

Figure 2:
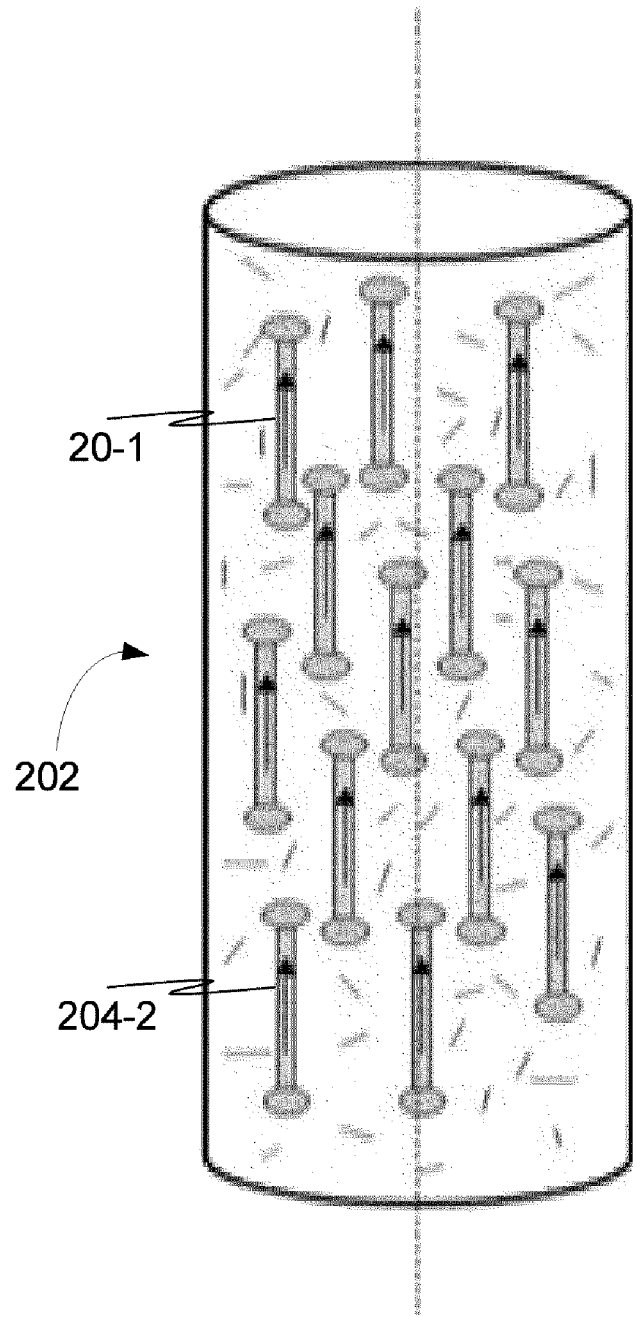
FIG. 2 illustrates orientation of a plurality of piezoelectric rods in a reinforcement in accordance with an embodiment of the invention.

Turning now to FIG. 2, a reinforcement 202 is shown illustrating orientation of a plurality of piezoelectric rods 204-n in accordance with an embodiment of the invention. Plurality of piezoelectric rods 204-n are oriented along a direction parallel to a longitudinal direction of reinforcement 202. As, reinforcement 202 is generally subjected to tensile stress, the orientation of piezoelectric rods 204-n along the longitudinal direction of reinforcement 202 supports high tensile vibration damping characteristics in reinforcement 202. In an embodiment of the invention, orientation of plurality of piezoelectric rods 204-n may be along a preferential direction reinforcement 202. This will enable increasing the vibration damping characteristics along the preferential direction.

Figure 3:
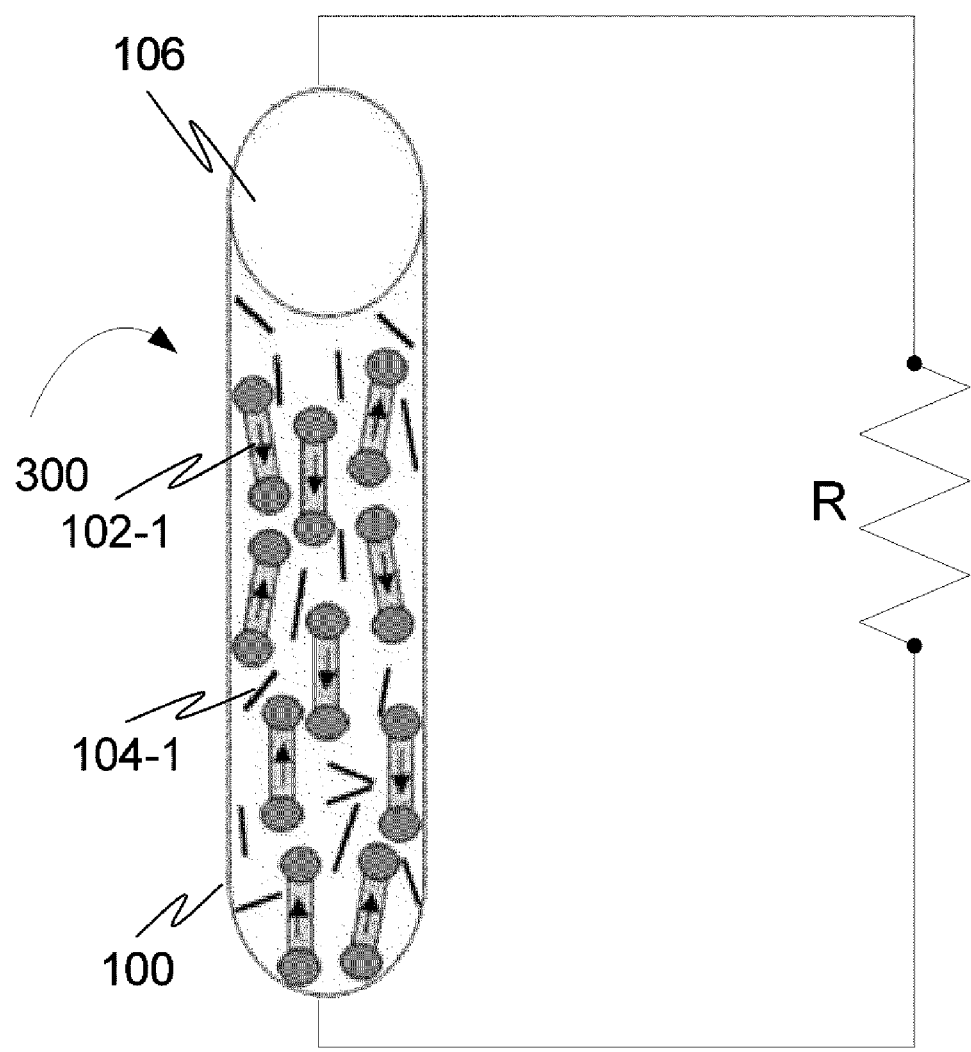
FIG. 3 illustrates a hypothetical electrical circuit for depicting vibration damping characteristic of a reinforcement in accordance with an embodiment of the invention.

FIG. 3 illustrates a hypothetical electrical circuit 300 depicting vibration damping characteristic of reinforcement 100 in accordance with an embodiment of the invention. Hypothetical electrical circuit 300 is formed between plurality of piezoelectric rods 102-n, plurality of conductive fibers 104-n and plastic matrix 106. In hypothetical electrical circuit 300, plurality of piezoelectric rods 102-n act like a battery by producing electrical charge, plurality of conductive fibers 104-n provide a conductive path for enabling flow of the electrical charge and plastic matrix 106 provides resistance R in the conductive path.

Hypothetical electrical circuit 300 is activated when reinforcement 100 experiences vibration. Vibration results in application of stress on each piezoelectric rod of plurality of piezoelectric rods 102-n. As the stress is applied on a piezoelectric rod, such as piezoelectric rod 102-1, shape of the piezoelectric rod is deformed. Deformation of the shape results in generation of electrical charge by piezoelectric rod 102-1. The electrical charge is gathered at electrodes 110-n and then passed through one or more conductive fibers, such as conductive fiber 104-1. The one or more conductive fibers may be placed in vicinity of the piezoelectric rod. Further, plastic matrix 106 around the piezoelectric rod and the one or more conductive fibers provides resistance to the electrical charge. Thereafter, the electrical charge is dissipated into heat energy by Joule Effect. As a result, vibration in reinforcement 100 is damped.

Therefore, activation of hypothetical electrical circuit 300 in reinforcement 100 results in imparting a vibration damping characteristic in reinforcement 100. In an embodiment, hypothetical electrical circuit 300 may be activated between a piezoelectric rod and one or more conductive fibers and plastic matrix 106 around the piezoelectric rod. In another embodiment, hypothetical electrical circuit 300 may be activated between a set of piezoelectric rods and one or more conductive fibers and plastic matrix 106 around the set of piezoelectric rods. Piezoelectric rods in the set of piezoelectric rods are oriented in one direction in such a scenario. Therefore, multiple hypothetical electrical circuits, such as hypothetical electrical circuit 300 may be formed in reinforcement 100, based on orientation of plurality of piezoelectric rods 102-n. The orientation of plurality of piezoelectric rods 102-n. has been explained in detail in conjunction with FIG. 2.

Figure 4:
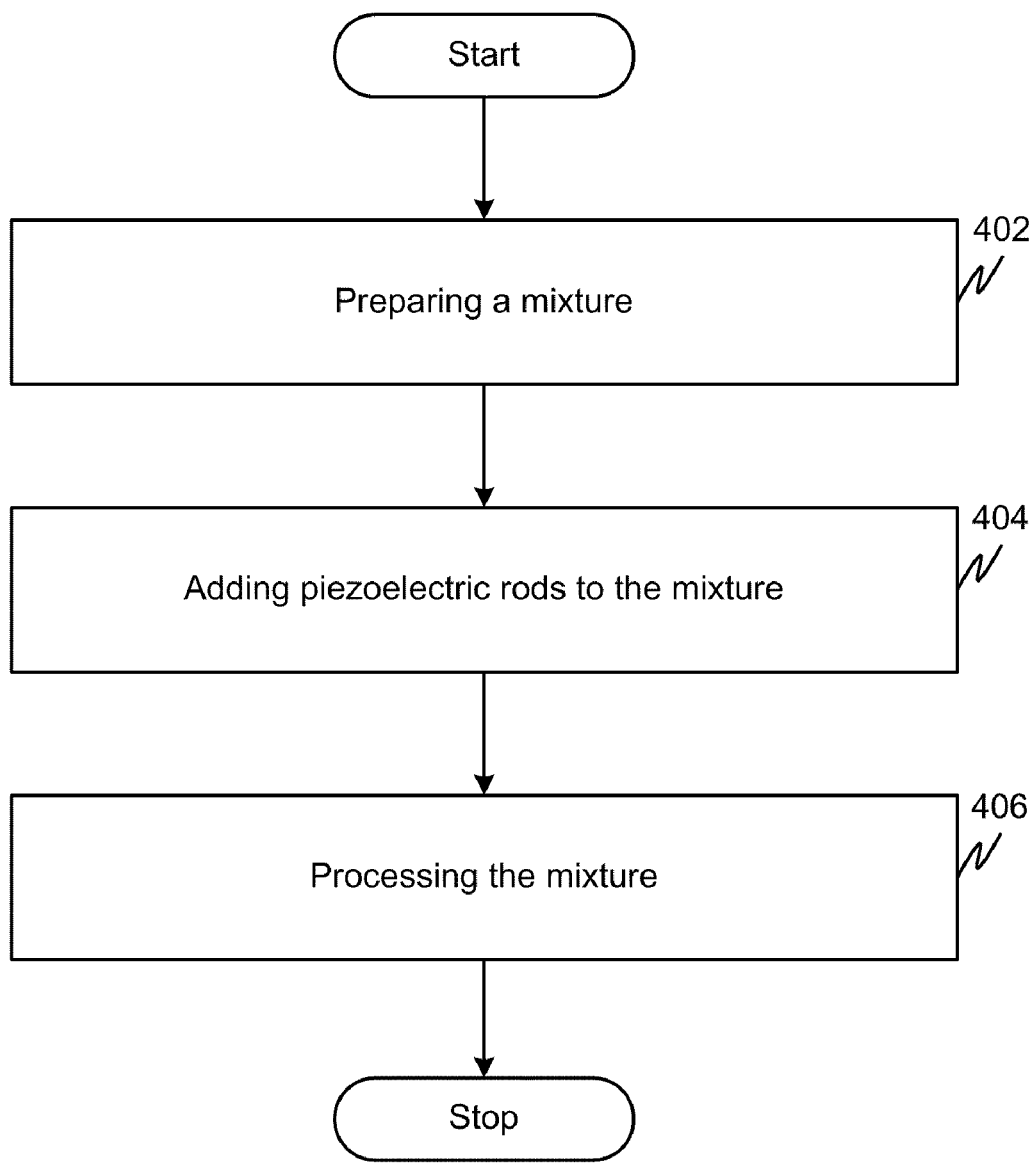
FIG. 4 illustrates a flow diagram of manufacturing of a reinforcement in accordance with various embodiments of the invention.

FIG. 4 illustrates a flow diagram of manufacturing reinforcement 100 in accordance with various embodiments of the invention. At step 402, a mixture of plurality of conductive fibers 104-n, and plastic matrix 106 is prepared. Weight percentage of plurality of conductive fibers 104-n in the mixture depends on a required level of vibration damping characteristic of reinforcement 100. Further, weight percentage of plastic matrix 106 depends on the required level of vibration damping characteristic of reinforcement 100 and required shape and size of reinforcement 100. In an embodiment, a liquid material, such as a liquid adhesive is also added to the mixture to prepare a paste of the mixture. In another embodiment, plurality of conductive fibers 104-n are added in plastic matrix 106, which is in a melted state.

Upon preparation of the mixture, plurality of piezoelectric rods 102-n are added to the mixture, at step 404. Weight percentage of plurality of piezoelectric rods 102-n to be added in the mixture is based on the required level of vibration damping characteristic of reinforcement 100. While adding plurality of piezoelectric rods 102-n to the mixture, each piezoelectric rod is polarized along a longitudinal direction of the piezoelectric rod.

Thereafter, at step 406, the mixture is processed to form reinforcement 100. Various known processing methods may be implemented to accomplish this. For example, processing may involve pouring the mixture in a mould, and drying the mixture.

Various embodiments of the invention provide a reinforcement for buildings which is capable of damping vibration in the buildings. The vibration damping capability is imparted by a mixture of the reinforcement which includes piezoelectric rods, conductive fibers, and plastic matrix. The mixture enables dissipation of mechanical stress developed due to vibration into heat energy. Further, usage of the piezoelectric rods enables maintaining strength and rigidity of the reinforcement. Moreover, as the piezoelectric rods are shaped like a dumbbell, each piezoelectric rod may effectively support the mechanical stress. Therefore, even high frequency of vibration in a building may be damped by the reinforcement. Such reinforcements may be used in the buildings such as, fabrication lab and NANO lab which host sensitive equipments, Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A reinforcement for buildings, the reinforcement comprising
   a mixture of
      a plurality of piezoelectric rods, wherein each piezoelectric rod is dumbbell shaped,
      a plurality of conductive fibers, and
      a plastic matrix,
   whereby the mixture imparts a vibration damping characteristic to the reinforcement.

2. The reinforcement of claim 1, wherein the reinforcement is rod shaped.

3. The reinforcement of claim 1, wherein the reinforcement is bar shaped.

4. The reinforcement of claim 1, wherein the reinforcement is rebar shaped.

5. The reinforcement of claim 1, wherein a level of the vibration damping characteristic is based on a ratio of the plurality of piezoelectric rods, the plurality of conductive fibers, and the plastic matrix in the mixture.

6. The reinforcement of claim 5, wherein the level of the vibration damping characteristic is directly proportional to the plurality of piezoelectric rods.

7. The reinforcement of claim 5, wherein the level of the vibration damping characteristic is directly proportional to a length/radius aspect ratio of a piezoelectric rod.

8. The reinforcement of claim 5, wherein the ratio of the plurality of piezoelectric rods, the plurality of conductive fibers, and the plastic matrix in the mixture determines an electrical resistance load that is inversely proportional to the plurality of conductive fibers; and
   wherein the ratio is selected to include a percentage of the plurality of conductive fibers to achieve an electrical resistance load that targets a specific vibration frequency to be absorbed.

9. The reinforcement of claim 1, wherein each end of a piezoelectric rod is coupled with an electrode.

10. The reinforcement of claim 9, wherein the electrode is shaped as an oblate ellipsoid.

11. The reinforcement of claim 9, wherein the electrode comprises a piezoelectric material.

12. The reinforcement of claim 9, wherein the electrode comprises a metal material.

13. The reinforcement of claim 9, wherein a level of the vibration damping characteristic is based on shape of the electrode.

14. The reinforcement of claim 1, wherein each piezoelectric rod is polarized along a longitudinal axis of the piezoelectric rod.

15. The reinforcement of claim 1, wherein the plurality of piezoelectric rods are aligned along a preferential direction of the reinforcement.

16. The reinforcement of claim 1, wherein each piezoelectric rod is aligned parallel to a longitudinal axis of the reinforcement.

17. The reinforcement of claim 1, wherein each conductive fiber is a carbon fiber.

18. The reinforcement of claim 1, wherein the plastic matrix comprises at least one of thermoplastic, polyethylene, polyvinyl chloride, polypropylene, polystyrene, and acrylonitrile butadiene styrene.

19. A method for manufacturing a reinforcement for buildings, the method comprising:
preparing a mixture of a plurality of conductive fibers and a plastic matrix;
adding a plurality of piezoelectric rods into the mixture, wherein each piezoelectric rod is dumbbell shaped; and
processing the mixture, upon addition of the plurality of piezoelectric rods into the mixture, to form the reinforcement, whereby a vibration damping characteristic is imparted to the reinforcement.

* * * * *